United States Patent
Cannillo et al.

(10) Patent No.: US 12,088,925 B1
(45) Date of Patent: Sep. 10, 2024

(54) FLICKER DETECTION USING EVENT-BASED READOUT CIRCUITS

(71) Applicant: Apple Inc., Cupertino, CA (US)

(72) Inventors: Francesco Cannillo, Munich (DE); Emanuele Mandelli, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/931,883

(22) Filed: Sep. 13, 2022

(51) Int. Cl.
| | |
|---|---|
| H04N 23/745 | (2023.01) |
| H04N 25/443 | (2023.01) |
| H04N 25/53 | (2023.01) |
| H04N 25/75 | (2023.01) |
| H04N 25/77 | (2023.01) |

(52) U.S. Cl.
CPC ......... *H04N 23/745* (2023.01); *H04N 25/443* (2023.01); *H04N 25/53* (2023.01); *H04N 25/75* (2023.01); *H04N 25/77* (2023.01)

(58) Field of Classification Search
CPC .... H04N 25/443; H04N 25/53; H04N 23/745; H04N 25/75; H04N 25/77
See application file for complete search history.

(56) References Cited

U.S. PATENT DOCUMENTS

| | | | |
|---|---|---|---|
| 7,187,405 B2* | 3/2007 | Poplin | .................. H04N 23/745 |
| | | | 348/226.1 |
| 8,379,107 B2 | 2/2013 | Chen | |
| 2020/0288073 A1 | 9/2020 | Berner et al. | |
| 2021/0067679 A1* | 3/2021 | Tornes | .................. H04N 23/745 |
| 2022/0132054 A1 | 4/2022 | Zhu et al. | |
| 2023/0108884 A1* | 4/2023 | Miyazaki | ............. H04N 23/745 |
| | | | 348/226.1 |

FOREIGN PATENT DOCUMENTS

WO 2017149433 9/2017

OTHER PUBLICATIONS

Tobi Delbrick, et al., "Adaptive Photoreceptor with Wide Dynamic Range", Proceedings of IEEE International Symposium on Circuits and Systems—ISCAS '94, 1994, pp. 339-342 vol.4.

(Continued)

*Primary Examiner* — Lin Ye
*Assistant Examiner* — Chriss S Yoder, III
(74) *Attorney, Agent, or Firm* — Robert C. Kowert; Kowert, Hood, Munyon, Rankin & Goetzel, P.C.

(57) ABSTRACT

An image capture device may include an image sensor having a plurality of light-sensitive pixel sensors to capture light from a scene for generating images and a flicker detection circuit to detect flicker in the light captured by the image sensor. The flicker detection circuit may include one or more event-based readout circuits and at least one event-based processing circuit. The event-based readout circuits may detect a series of events associated with the flicker in the light captured by the image sensor. The event-based processing circuit may determine a frequency of the flicker in the captured light based on the series of events detected by the event-based readout circuits. In some embodiments, the frequency may be used to adjust the exposure time of the image sensor, e.g., to identify intervals for exposure when the captured light is bright.

17 Claims, 14 Drawing Sheets

(56) References Cited

OTHER PUBLICATIONS

Patrick Lichsteiner, et al., "A 128x128 120dB 15us Latency Asynchronous Temporal Contrast Vision Sensor", in IEEE Journal of Solid-State Circuits, vol. 43, No. 2, pp. 566-576, Feb. 2008.

Olav E. Liseth, et al., "Power-Efficient Cross-Correlation Beat Detection in Electrocardiogram Analysis Using Bitstreams", in IEEE Transactions on Biomedical Circuits and Systems, vol. 4, No. 6, pp. 419-425, Dec. 2010.

\* cited by examiner

FLICKER DETECTION USING EVENT-BASED READOUT CIRCUITS

BACKGROUND

Technical Field

This disclosure relates generally to an image capture device and, more specifically, to circuits of an image capture device for detecting flickering light.

Description of the Related Art

A mobile multipurpose device, such as a computer, smartphone, tablet, pad device, etc., may use an image capture device such as a camera to capture images of a scene. Some scenes may include light sources to provide ambient light. In addition, some sort of light sources, such as flash bulbs, light-emitting diodes (LED), or some other sort of lamps, may be provided with the image capture devices to add lighting, as needed, to the scene being captured. These light sources, specifically artificial light sources, may produce illumination of intensity varying periodically with a frequency. This phenomenon is also called flicker. For example, some fluorescent light bulbs may produce flickering illumination at about 60 Hz, and some LEDs may have illumination of a flickering frequency around 100 Hz. Such flickering behavior may adversely affect the captures of images. For example, short camera exposures may not integrate sufficient time to low pass filter the flickering light, and rolling shutter exposure mode may cause exposure "beats" with illumination frequency.

In some systems, an image capture device may be synchronized with the frequency of a flickering light source that provides the ambient light. However, the flickering frequency of the light source is not always readily available. Sometimes, an image capture device may use a dedicated flicker detector, e.g., a dedicated ambient light sensor, to detect flickering ambient light in the scene being captured. The flicker detector must have a large enough area, in contrast with pixel area of the image sensor of the image capture device, such that the flicker detector can be exposed to the average scene luminance for reliable flicker detection. As a result, the flicker detector cannot share the same aperture with the image sensor. Such solutions add significant design complexity to image capture devices. Thus, it is desirable for flicker detection solutions that can reliably detect light flicker but also is suitable for implementation on image capture devices.

Figure 1:
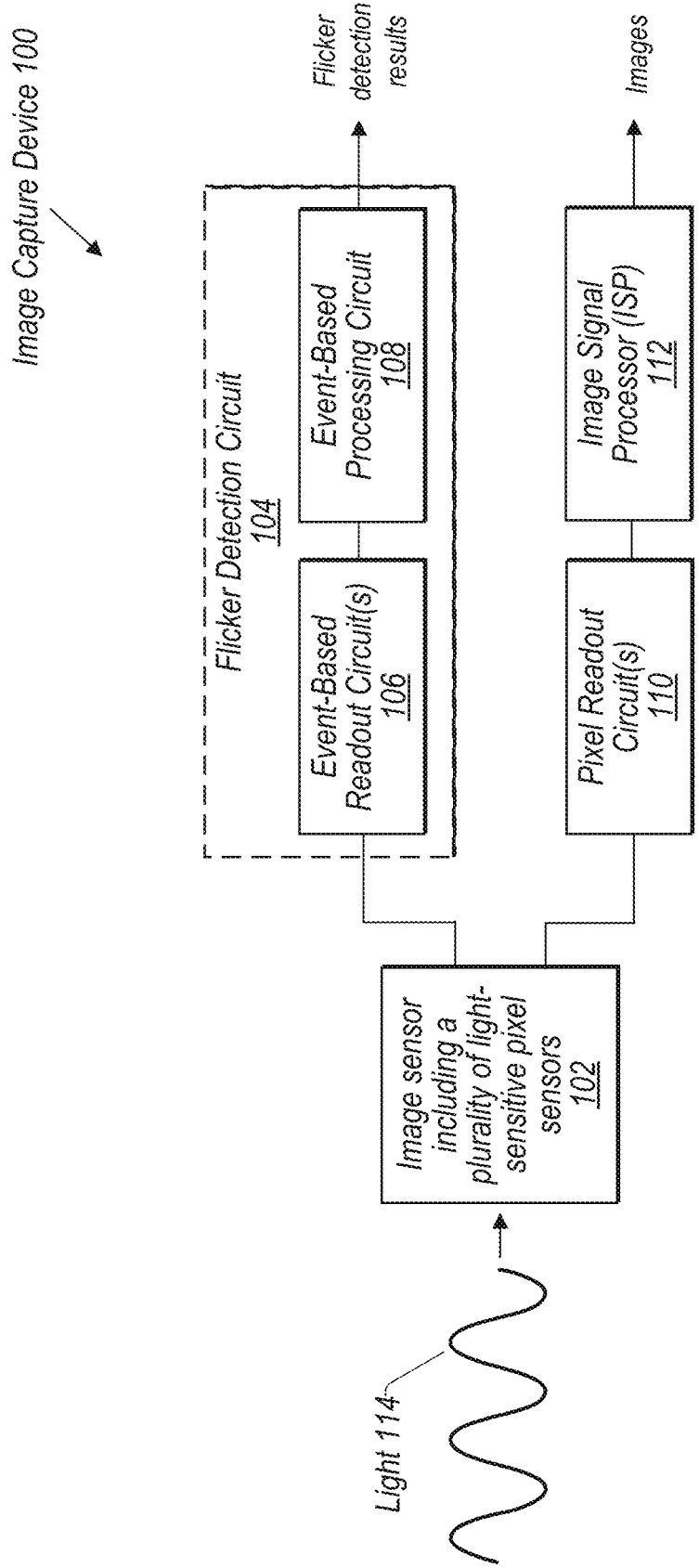
FIG. 1 shows an example image capture device including a flicker detection circuit, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

"Comprising." This term is open-ended. As used in the appended claims, this term does not foreclose additional structure or steps. Consider a claim that recites: "An apparatus comprising one or more processor units . . . ." Such a claim does not foreclose the apparatus from including additional components (e.g., a network interface unit, graphics circuitry, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs those task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. § 112(f) for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configure to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, a buffer circuit may be described herein as performing write operations for "first" and "second" values. The terms "first" and "second" do not necessarily imply that the first value must be written before the second value.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While in this case, B is a factor that affects the determination of A, such a phrase does not foreclose the determination of A from also being based on C. In other instances, A may be determined based solely on B.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the intended scope. The first contact and the second contact are both contacts, but they are not the same contact.

The terminology used in the description herein is for the purpose of describing particular embodiments only and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

DETAILED DESCRIPTION

Various embodiments described herein relate to a circuit of an image capture device for detecting light flicker. In some embodiments, the circuit may include one or more event-based readout circuits and at least one event-based processing circuit. The circuit may be used in combination with an image sensor of the image capture device to detect flicker of light captured by the image sensor. In some embodiments, the circuit may also determine a frequency of the flickering light. In some embodiments, the image capture device may be integrated as part of a mobile multipurpose device, such as a computer, smartphone, tablet, pad device, and the like.

In some embodiments, the image sensor may be an active pixel sensor, such as a complementary metal-oxide-semiconductor (CMOS) image sensor or a charge-coupled device (CCD) image sensor, which may be used to not only detect light flicker but also produce signals for generating images. For example, in some embodiments, the image capture device may include one or more optical lenses that may pass light from a scene to the image sensor. In turn, the image sensor may generate image signals. In some embodiments, the image capture device may include one or more image signal readout circuits, which may read the image sensors from the image sensor. The image signals may further be processed by an image signal processor (ISP) to produce images of the scene. In some embodiments, according to signals from the image sensor, the image capture device may also use the event-based readout circuits of the flicker detection circuit to detect a series of events associated with flicker of the light captured by the image sensor. In addition, the event-based processing circuit of the flicker detection circuit may determine a frequency of the flicker based on the series of events detected by the event-based readout circuits.

In some embodiments, to determine the light flickering frequency, the event-based processing circuit may perform spectral analysis and/or bitstream analysis of the series of events. In addition, in some embodiments, the event-based processing circuit may determine the light flickering frequency based on bitstream auto-correlation of the series of events, and determine one or more recommended intervals for exposing the image sensor to the light based on bitstream cross-correlation of the series of events. In some embodiments, the frequency may be also used to modify the exposure time of the image sensor. For example, in some embodiments, the exposure frequency may be adjusted to be an integer multiple of the light flickering frequency to reduce effects of the light flickering.

In some embodiments, the image sensor may include a plurality of pixel sensors or pixel unit cells, e.g., photodetectors or photodiodes. In some embodiments, the flicker detection circuit may be implemented at pixel level. For example, the flicker detection circuit may include a plurality of event-based readout circuits, one for each of the pixel sensors of the image sensor. In some embodiments, the flicker detection circuit may be implemented at cluster level. For example, the pixel sensors of the image sensor may be divided into several groups or subsets, e.g., according to the row number and/or column number of the pixel sensors in layout on the image sensor. The flicker detection circuit may include a plurality of event-based readout circuits, one for each cluster of pixel sensors.

In some embodiments, the image signal readout circuits and the event-based readout circuits of the image capture device may be electrically coupled together to the same electrodes (e.g., the same cathodes) of pixel sensors of the image sensor. In that case, the image capture device may further include switches to multiplex the electrical coupling between the image signal readout circuits and the event-based readout circuits with the electrodes (e.g., cathodes) of the pixel sensors, such that signals from the pixel sensors may be obtained by the image signal readout circuits and event-based readout circuits during different periods of time. In some embodiments, the image signal readout circuits and the event-based readout circuits may be electrically coupled to different electrodes of the pixel sensors. For example, one image signal readout circuit may be electrically coupled to a cathode of a pixel sensor, whereas event-based readout circuit may be electrically coupled to an anode of the same pixel sensor. In that case, the image capture device may not necessarily need the switches to multiplex signal reading between the image signal readout circuits and the event-based readout circuits. In other words, signals from the pixel sensors may be obtained by the image signal readout circuits and event-based readout circuits during the same periods of time.

The disclosed flicker detection circuit provide several benefits. As described above, conventional flicker detection solutions generally require dedicated large-area flicker detection sensor, which can add significant design complexity to an image capture device. By comparison, the flicker detection circuit described in this disclosure may be implemented conveniently in an image capture device, because it may not necessarily require such a dedicated flicker detection sensor. Instead, as described above, the flicker detection circuit may leverage and use the existing image sensor of an image capture device to detect light flicker. Some motion detection systems also use event-based readout circuits for motion detection. However, the event-based readout circuits of these motion detection systems are generally configured not for, but rather to avoid, detection of light flicker. Otherwise, the motion detection systems would flag incorrect events caused by flicker in the ambient light. For example, some parameters, such as thresholds of their event-based readout circuits, may be set at values to provide sensitivity sufficient to detect "positive" movements of a subject, but insufficient to detect flicker in the ambient light.

FIG. 1 is a block diagram showing an example image capture device including a flicker detection circuit, according to some embodiments. In this example, image capture device 100, such as a camera, may use image sensor 102 to capture light for generating images of a scene. In some embodiments, image sensor 102 may be an active pixel image sensor (e.g., a CMOS image sensor, a CCD image sensor, and the like), which may include a plurality of light-sensitive pixel sensors (e.g., photodetectors or photodiodes) (hereinafter "pixel sensors"). In some embodiments, image capture device 100 may include one or more optical lenses (not shown) that may pass light 114 from the scene to the pixel sensors of image sensors 102. The pixel sensors of image sensors 102 may generate signals (e.g., currents based on received light 114). In some embodiments, image capture device 100 may include one or more pixel readout circuits 110 to read signals from image sensor 102. In some embodiments, pixel readout circuits 110 may process the signals, e.g., by integrating currents from the pixel sensors (e.g., photodetectors or photodiodes) into capacitance to generate voltages. The generated (voltage) signals may further be obtained and processed by image signal processor (ISP) 112 to accordingly generate images of the scene.

In some embodiments, image capture device 100 may further include flicker detection circuit 104 to detect flicker of light 114 captured by image sensor 102. In some embodiments, flicker detection circuit 104 may include one or more event-based readout circuits 106 and at least one event-based readout processing circuit 108. As indicated in FIG. 1, in this example, image capture device 100 may use flicker detection circuitry 104, in combination with image sensor 102 (that is also used for capturing images), to detect the light flicker.

In some embodiments, event-based readout circuits 106 may detect a series of events associated with the flicker of light 114 based on signals from the pixel sensors of image sensor 102. In some embodiments, the series of events may be analyzed by event-based processing circuit 108 to determine existence of flicker of light 114. In addition, in some embodiments, event-based processing circuit 108 may determine a frequency of flicker of light 114 based on the analysis of the series of events. For example, event-based processing circuit 108 may perform spectral analysis and/or bitstream correlation to identify a dominant harmonic component in the series of events, which may indicate the existence and frequency of the flicker of light 114. In some embodiments, event-based processing circuit 108 may also determine one or more recommended intervals for exposing image sensor 102 to light 114. The recommended intervals may correspond to intervals when the light intensity is high. In some embodiments, information of the recommended intervals may be provided to other component(s) of image capture device 100, e.g., a shutter controller, to control exposure of image sensor 102 to light 114 to improve performance and quality of the image capturing. In some embodiments, these flicker detection results, including existence of the flicker, the flickering frequency, and/or recommended intervals, may be provided to the ISP, e.g., to compensate for the effects caused by the flicker to improve quality of captured images. In some embodiments, image sensor 102 (including a plurality of pixels), flicker detection circuit 104 (including one or more event-based readout circuits 106 and event-based processing circuits 108), one or more pixel readout circuits 110, and even a circuit configured to adjust the image sensor exposure timing may all reside on the same integrated circuit (IC).

Figure 2:
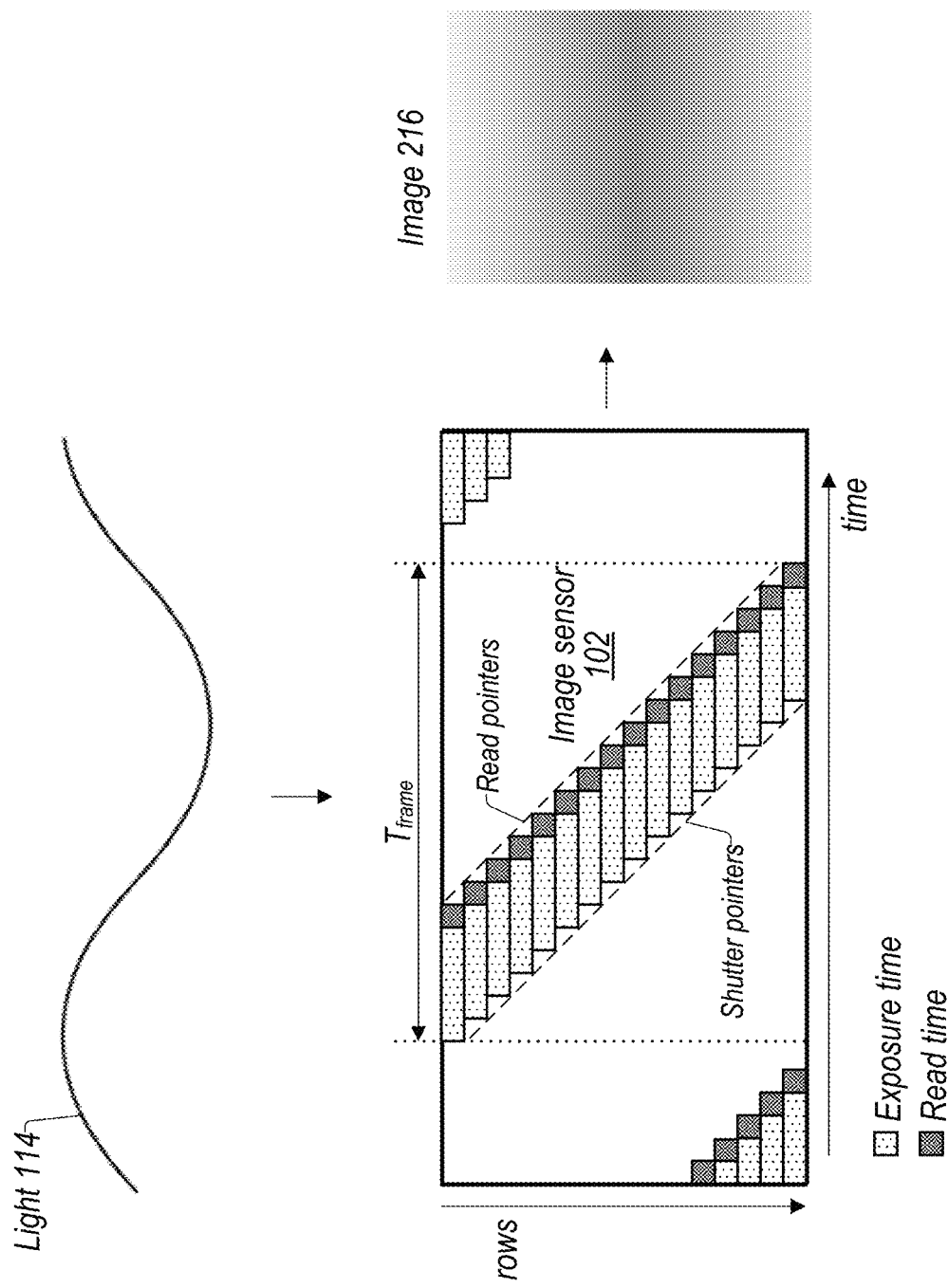
FIG. 2 shows impact of flickering light on image capturing of an image capture device, according to some embodiments.

FIG. 2 is a diagram showing impact of flickering light on image capturing of an image capture device, according to some embodiments. As described above, some light sources, such as artificial light sources, may produce illumination of intensity varying periodically with a frequency, e.g., spanning from tens of Hz to few kHz. As indicate in FIG. 2, for purposes of illustration, light 114 is illustrated by a sinusoidal signal with an amplitude (or intensity) varying at a flickering frequency. In some embodiments, image capture device 100 may use rolling shutter techniques to capture light to generate images of a scene. With rolling shutter, not all the pixel sensors of image sensor 102 are exposed at the same time. Instead, the start and end of exposure on individual pixel sensors may happen sequentially, e.g., on a row-by-row or column-by-column basis. For example, as indicated in FIG. 2, the pixel sensors of image sensor 102 may be exposed and read out on a row-by-row basis. Pixel sensors on the first row may be exposed and read out first, pixel sensors on the second row may be exposed and read out next, and so on. In FIG. 2, the two dashed lines respectively indicate the approximate points-in-time to start exposing the individual pixel sensors (e.g., the shutter pointers) and reading signals from the pixel sensors for generating images (e.g., the read pointers), and $T_{frame}$ represents the time for completing exposure and reading of pixel sensors of image sensor 102 for a given frame. Thus, pixel sensors on different rows may capture light 214 at different intensity. As a result, this may cause shading, band, or other visual artifacts in image 216, as indicated in FIG. 2.

Figure 3:
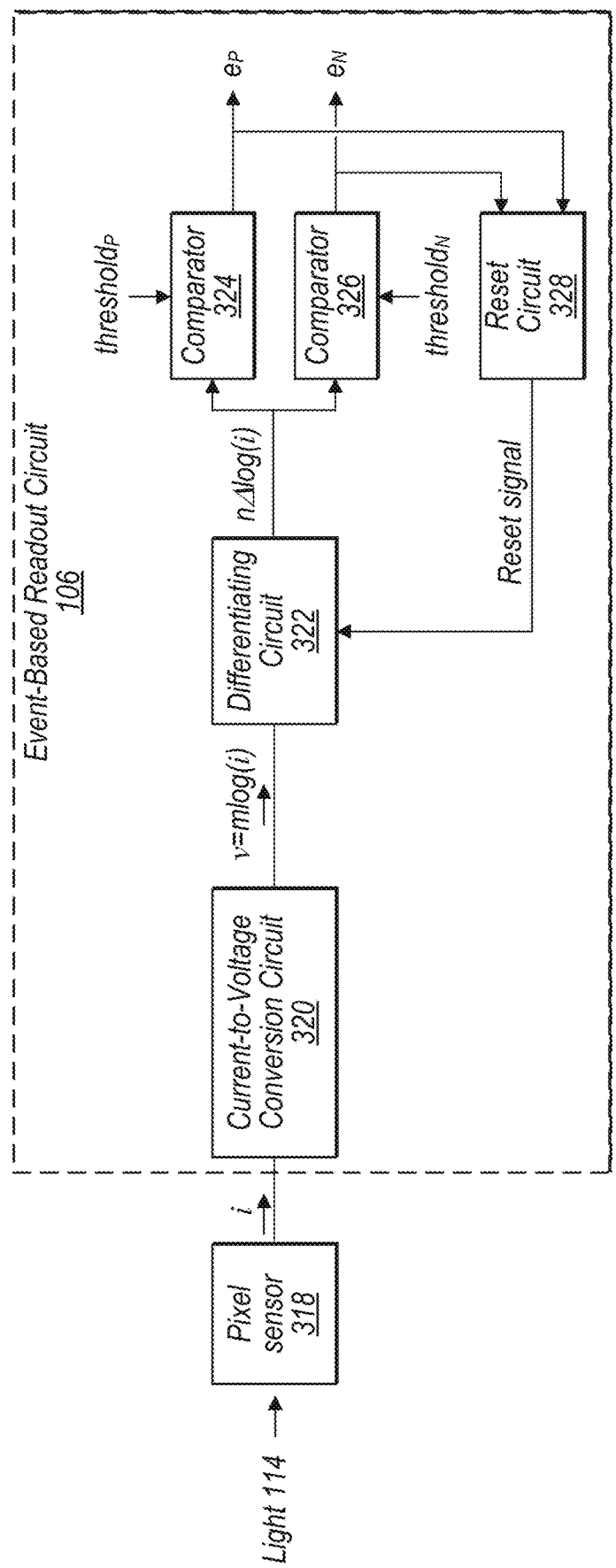
FIG. 3 shows an example event-based readout circuit, according to some embodiments.

FIG. 3 is a block diagram showing an example event-based readout circuit, according to some embodiments. For purposes of illustration, only one pixel sensor is displayed in FIG. 3 as an example. As described in more detail below, flicker detection circuit 104 may be implemented at pixel level or cluster level. In FIG. 3, pixel sensor 318 of image sensor 102 may capture light 114 from a scene. In some embodiments, pixel sensor 318 may be a photodetector or photodiode, which may generate a signal, e.g., current I, in response to the capture of light 114.

In some embodiments, the signal, e.g., current i, may be obtained or read out by circuit 320 of event-based readout circuit 106. In some embodiments, circuit 320 may include a current-to-voltage conversion circuit, e.g., a transimpedance operational amplifier, that converts the input current i into an output voltage v. For purposes of illustration, in this example, it is assumed that the output voltage v corresponds to a logarithm of the input current i. In other words, v equals m×log(i), where m is a gain of the transimpedance operational amplifier.

In some embodiments, the output signal (e.g., voltage v) of circuit 320 may be provided to differentiating circuit 322 as input. Differentiating circuit 322 may generate a signal (e.g., a voltage) that is appropriately proportional to the rate of change of the input (e.g., voltage v). In this example, since voltage v corresponds to a logarithm of the current i from pixel sensor 318, the output signal from differentiating circuit 322 (also called "temporal contrast") may thus be appropriately proportional to the rate of change of the logarithm of current i. In other words, temporal contrast equals $n \times \Delta \log(i)$, where $\Delta$ represents a derivative function and n is a gain of differentiating circuit 322.

In some embodiments, the temporal contrast from differentiating circuit 322 (e.g., $n \times \Delta \log(i)$) may be provided to at least one comparator circuit as input to compare with at least two thresholds to respectively generate two signals $e_p$ and $e_N$. For purposes of illustration, in this example, the comparison is performed using two separate comparator circuits 324 and 326. Comparator circuit 324 may compare the temporal contrast (e.g., $n \times \Delta \log(i)$) with a first threshold ($threshold_p$) to generate signal $e_p$, whereas comparator circuit 326 may compare the temporal contrast (e.g., $n \times \Delta \log(i)$) with a second threshold ($threshold_N$) to generate signal $e_N$. Alternatively, in some embodiments, the comparison may be implemented using one single comparator circuit, e.g., comparator circuits 324 and 326 may be "merged" into one comparator circuit with at least three inputs respectively for the temporal contrast, $threshold_p$, and $threshold_N$.

In some embodiments, $threshold_p$ and $threshold_N$ may be configured to respectively have a positive value and a negative value. Because the temporal contrast is approximately proportional to the rate of change of current i, which further represents the rate of change of the intensity of light 114 captured by pixel sensor 318, event-based readout circuit 106 may thus be able to use signals $e_p$ and $e_N$ to indicate detection of flicker of light 114. For example, when the intensity of light 114 increases at a rate higher than $threshold_p$ (also called a positive event), the subsequently generated temporal contrast may become larger than $threshold_p$, and event-based readout circuit 106 may generate $e_p$ at a logic high voltage. Similarly, when the intensity of the light received by pixel sensor 318 decreases at a rate higher than $threshold_N$ (also called a negative event), the subsequently generated temporal contrast may become less than $threshold_N$, event-based readout circuit 106 may generate $e_N$ at a logic high voltage. Thus, signals $e_p$ and $e_N$ may represent a series of detected positive and negative events associated with flicker of light 114 captured by pixel sensor 318. For example, signals $e_p$ and $e_N$ may be binary signals toggling between a logic high voltage and a logic low voltage. Logic high $e_p$ may correspond to detected positive events, whereas logic high $e_N$ may correspond to detected negative events. Thus, by counting the number of logic highs in $e_p$ and $e_N$, the number of detected positive and negative events may be respectively determined.

In some embodiments, the frequencies of positive and negative event signals $e_p$ and $e_N$ (e.g., from kHz to MHz) may be higher than the frame rate of the image sensor 102 whose speed is limited by integration of the current of pixel sensor 318. In some embodiments, event-based readout circuit 106 may further include reset circuit 328. Reset circuit 328 may generate at least one reset signal once an event is generated (from comparator circuits 324 and/or 326) to reset differentiating circuit 322. The reset of differentiating circuit 322 may remove accumulated DC offset, such that differentiating circuit 322 may not necessarily follow an absolute value of the light intensity and thus be able to appropriately track flickering light.

As described above, some motion detection systems also use event-based readout circuits to detect movement of subjects. However, in these systems, the thresholds of event-based readout circuits are generally configured to avoid detection of light flicker because it can otherwise cause false motion detection events. For example, the thresholds of event-based readout circuits of the motion detection systems may be set at values larger than the above described $threshold_p$ and $threshold_N$ to provide sensitivity lower than event-based readout circuit 106, such that flicker of light 114 may not trigger false motion events.

In some embodiments, the flicker detection may be implemented at pixel level. For example, flicker detection circuit 104 may include a plurality of event-based readout circuits 106, one for each pixel sensor 318 of image sensor 102. Each pixel sensor 318 may generate signals based on the respective captured light, and the signals may be obtained or read out by one corresponding event-based readout circuit 106 to generate a series of positive and/or negative events $e_p$ and $e_N$. In some embodiments, the flicker detection may be implemented at cluster level. In this case, pixel sensors 318 of image sensor 102 may be divided into several groups or subsets, each of which may include multiple pixel sensors 318. flicker detection circuit 104 may include a plurality of event-based readout circuits 106, one for each group or subset of pixel sensors 318. The sum of signals (e.g., sum of currents) of pixel sensors 318 in one group may be obtained by one corresponding event-based readout circuit 106 to generate a series of positive and/or negative event signals $e_p$ and $e_N$.

Figure 4:
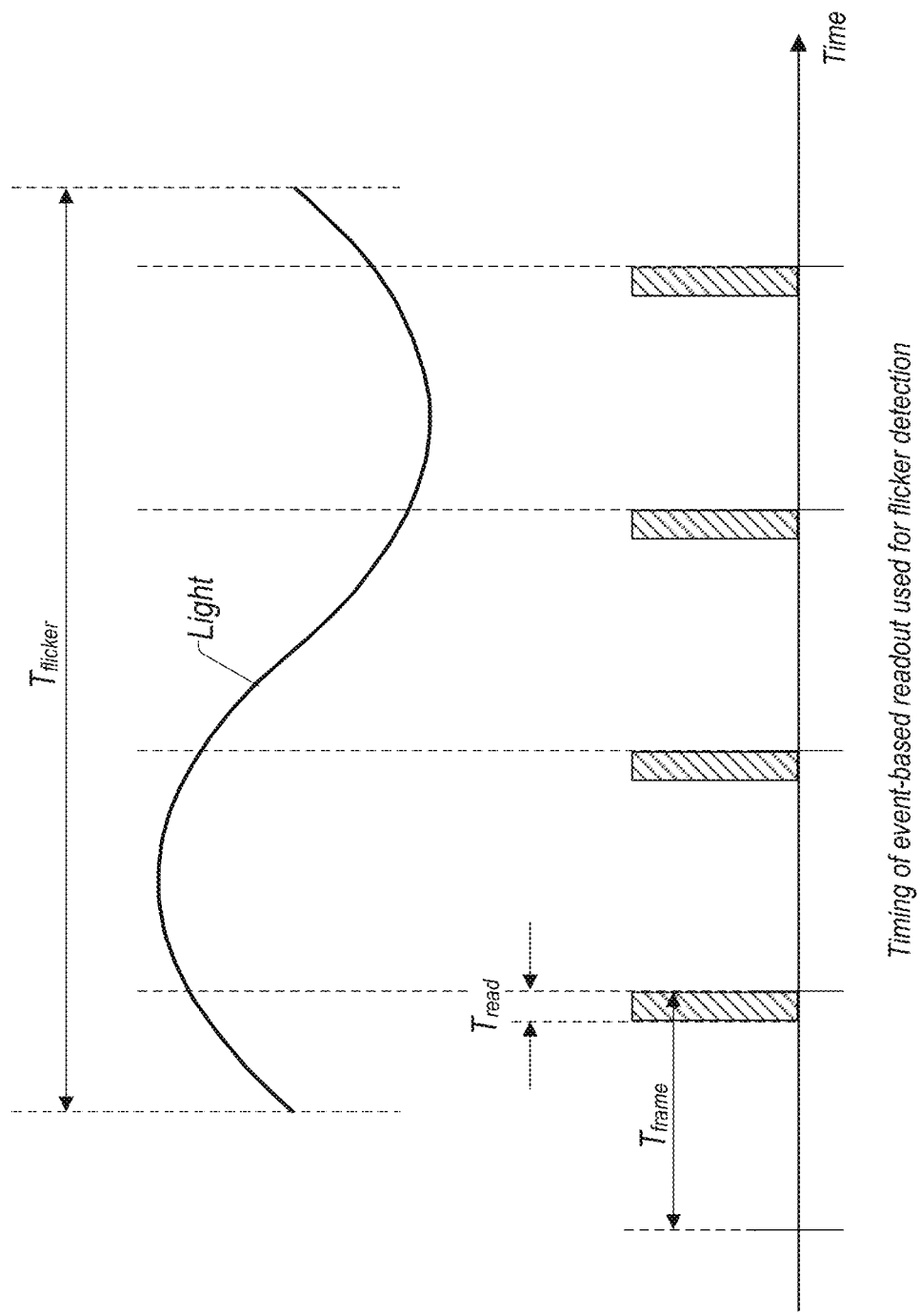
FIG. 4 timing of reading signals from an image sensor for flicker detection, according to some embodiments.

In some embodiment, the total number of positive and/or negative events represented by $e_p$ and $e_N$ in a readout window $T_{read}$ may be counted every $T_{frame}$, e.g., for a duration of time of at least one flickering period $T_{flicker}$, as indicated in FIG. 4. In some embodiments, because $T_{flicker}$ may not be readily available, the duration of time may be a predetermined duration that is longer than flickering periods of typical artificial light sources. FIG. 4 shows timing of reading signals from an image sensor for flicker detection, according to some embodiments. In FIG. 4, $T_{frame}$ represents the time for exposing and reading of image sensor 102 for a given frame (as described in FIG. 2), $T_{read}$ represents the time for reading signals from image sensor 102 for detecting light flicker, and $T_{flicker}$ represents the period of flicking light. As indicated in FIG. 4, for each $T_{frame}$, the number of positive and/or negative events during $T_{read}$ may be counted once, and the counting of the events may last for $T_{flicker}$. As described in more detail below, the reading of signals from image sensor 102 for detecting light flicker may not necessarily performed at the same time as reading of signals from image sensor 102 for capturing images.

In some embodiments, the counted number of positive and/or negative events from signals $e_p$ and $e_N$ may be analyzed by event-based processing circuit 108 to determine existence of flicker in the captured light. In some embodiments, event-based processing circuit 108 may also determine a frequency of the flickering light based on analysis of the series of positive and/or negative events. In some embodiments, the analysis may include spectral analysis (e.g., a fast Fourier transform (or FFT) analysis) of the events. The spectral analysis may identify a dominant or fundamental harmonic component of the generated events, which may correspond to the flickering component of the captured light.

Figure 5:
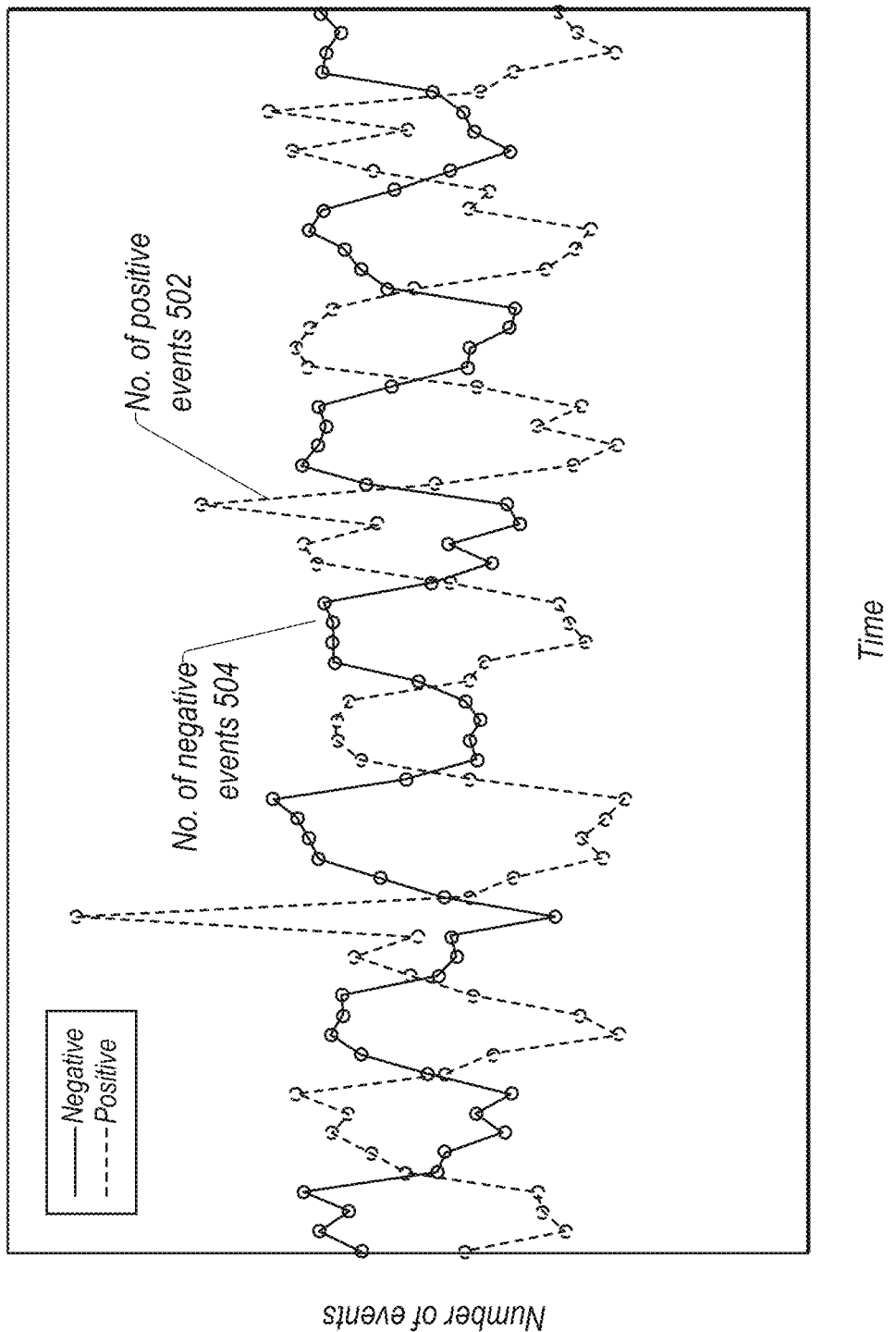
FIG. 5 shows example numbers of events detected by a flicker detection circuit, according to some embodiments.
Figure 6:
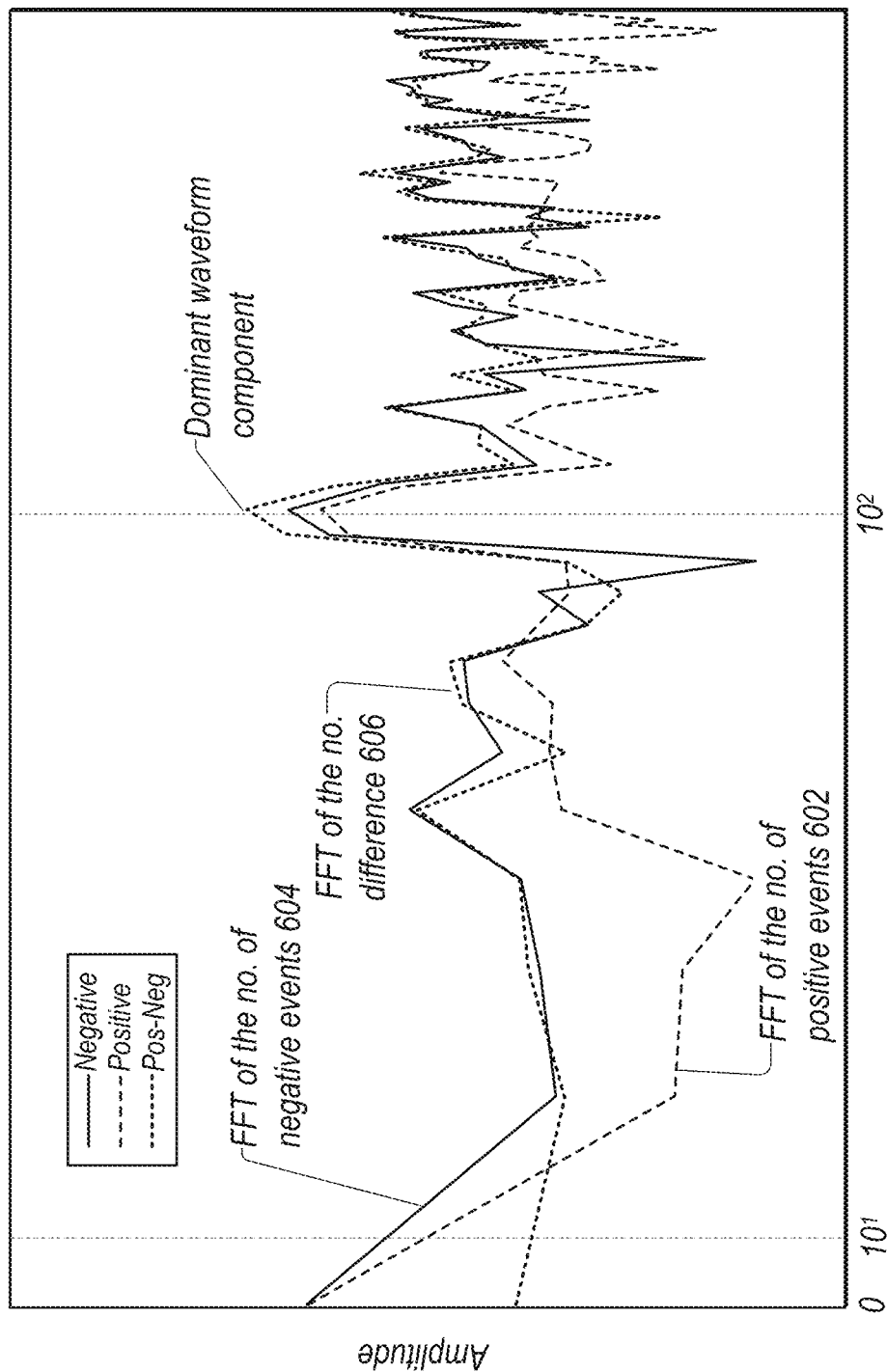
FIG. 6 shows spectral analysis results of the events in FIG. 5, according to some embodiments.

FIG. 5 is a diagram showing example numbers of events detected by a flicker detection circuit, according to some embodiments. As indicated in FIG. 5, the number of positive events and the number of negative events may be counted separately as indicated by plots 502 and 504. In this example, the flicking light is generated from a LED light source of a flickering frequency at 100 Hz. FIG. 6 is a diagram showing spectral analysis results of the events in FIG. 5, according to some embodiments. As indicated in FIG. 6, in this example, spectral analysis is performed respectively on the number of positive events, the number of negative events, and the difference between the number of positive events and the number of negative events (e.g., the number of positive events minus the number of negative events), and thus produces three different plots 602, 604, and 606. In all three plots, the frequency of the dominant waveform or harmonic component (e.g., the harmonic component of the largest amplitude) is approximately 100 Hz, which corresponds to the flickering frequency of the LED light source. Thus, by identifying the dominant frequency by spectral analysis, flickering light and flickering frequency may be determined.

In some embodiments, as described above, in FIG. 6, the spectral analysis is also performed on the difference between the number of positive events and the number of negative events. (e.g., the number of positive events minus the number of negative events). In some embodiments, the subtraction between the two may remove common mode noises from motion events, thus improving the flicker detection reliability. Also, in some embodiments, to further provide detection reliability, flicker detection circuit 104 may compare the amplitude of the dominant or fundamental component from spectral analysis with a threshold. Only when the amplitude is larger than the threshold, flicker detection circuit 104 may determine that the dominant or fundamental component is caused by light flicker, and the corresponding frequency is a flickering frequency.

In some embodiments, event-based processing circuit 108 may perform bitstream correlation on the series of positive and/or events detected by event-based readout circuits 106. Given two binary coded bitstreams, the bitstream correlation may be calculated by multiplying corresponding elements from the two bitstreams and then summing the products. Bitstream cross-correlation calculates the correlation on two different bitstreams, whereas bitstream auto-correlation calculates the correlation of one bitstream and itself. Given that the signals $e_p$ and $e_N$ are already binary digital signals, the bitstream correlation may thus be performed directly on the signals $e_p$ and $e_N$, thus not requiring the counting of positive and/or negative events from these signals. Sometimes, the bitstream correlation may also provide good computational efficiency, since the calculation may be implemented in digital domain using basic logic gates.

Figure 7:
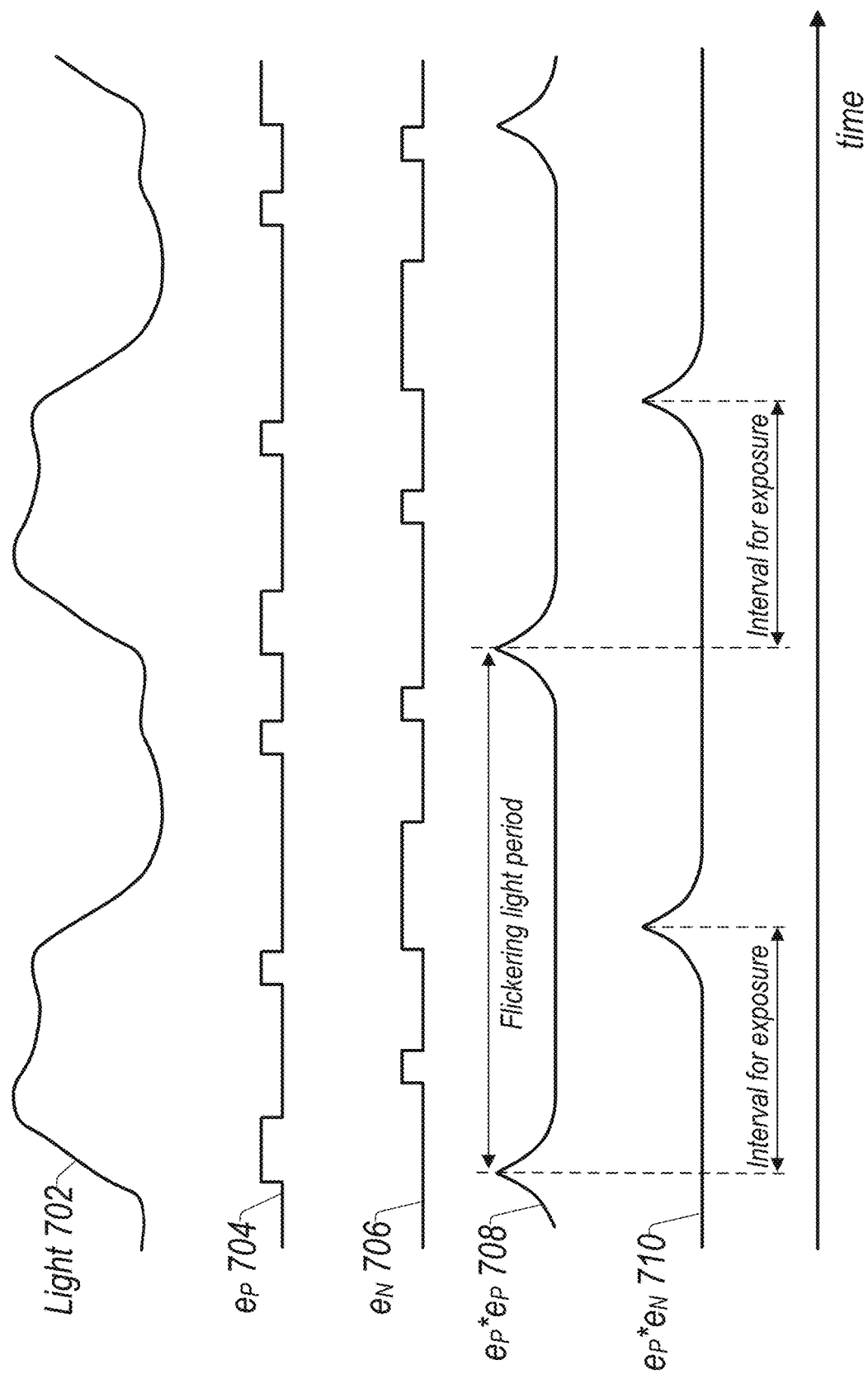
FIG. 7 shows example bitstream correlation on a series of events, according to some embodiments.

FIG. 7 shows example bitstream correlation on a series of events, according to some embodiments. In FIG. 7, all plots are shown in the time domain. In this example, plot 702 represents the intensity of flickering light, and plots 704 and 706 may represent positive and negative event signals $e_p$ and $e_N$ detected by event-based readout circuits 106. As indicated in FIG. 7, signals $e_p$ and $e_N$ may be binary signals toggling between a logic high voltage and a logic low voltage, thus each may be treated directly. Plot 708 may represent the result of bitstream auto-correlation of the signal $e_p$, whereas plot 710 may represent the result of bitstream cross-correlation of signals $e_p$ and $e_N$. In some embodiments, the period (or frequency) of flickering light may be determined according to the result of bitstream auto-correlation. For example, as indicated in FIG. 7, by identifying the peaks or highest values of the auto-correlation of $e_p$ in plot 708, the period (or frequency) of the peaks may indicate the flickering light period (or frequency). In addition, in some embodiments, one or more intervals may be determined suitable for exposing image sensor 102 according to the result of bitstream cross-correlation. For example, as indicated in FIG. 7, one or more intervals may be identified between the peaks of the bitstream auto-correlation of $e_p$ (on plot 708) and the peaks of the bitstream cross-correlation of $e_p$ and $e_N$ (on plot 710). In some embodiments, these intervals may correspond to time durations when the intensity of the light (though flicking) is relatively high (e.g., in reference to plot 702), or in other words, when the light is relatively bright. As described above, in some embodiments, information about timing of these intervals may be provided to other components of image capture device 100, to control exposure timing of image sensor 102 to improve performance and quality of the image capturing. In some embodiments, to improve flicker detection reliability, the event-based processing circuit 108 may compare the above described peaks of the bitstream auto-correlation and/or cross-correlation with thresholds to filter out nuisance peaks, so that appropriate peaks caused by the light flicker may be correctly localized.

Note that in above description, flicker detection circuit 104 may be used in combination with image sensor 102, e.g., an active pixel sensor, to perform the flicker detection. In some embodiments, flicker detection circuit 104 may also be used in combination with a dedicated flicker sensor to detect light flicker. For example, in some embodiments, image capture device 100 may include an ambient light sensor that captures ambient light from a scene. Signals from the ambient light sensor may be obtained and processed by flicker detection circuit 104, in a way substantially similar to what is described above in regard to image sensor 102, to detect flicker in the ambient light.

Figure 8:
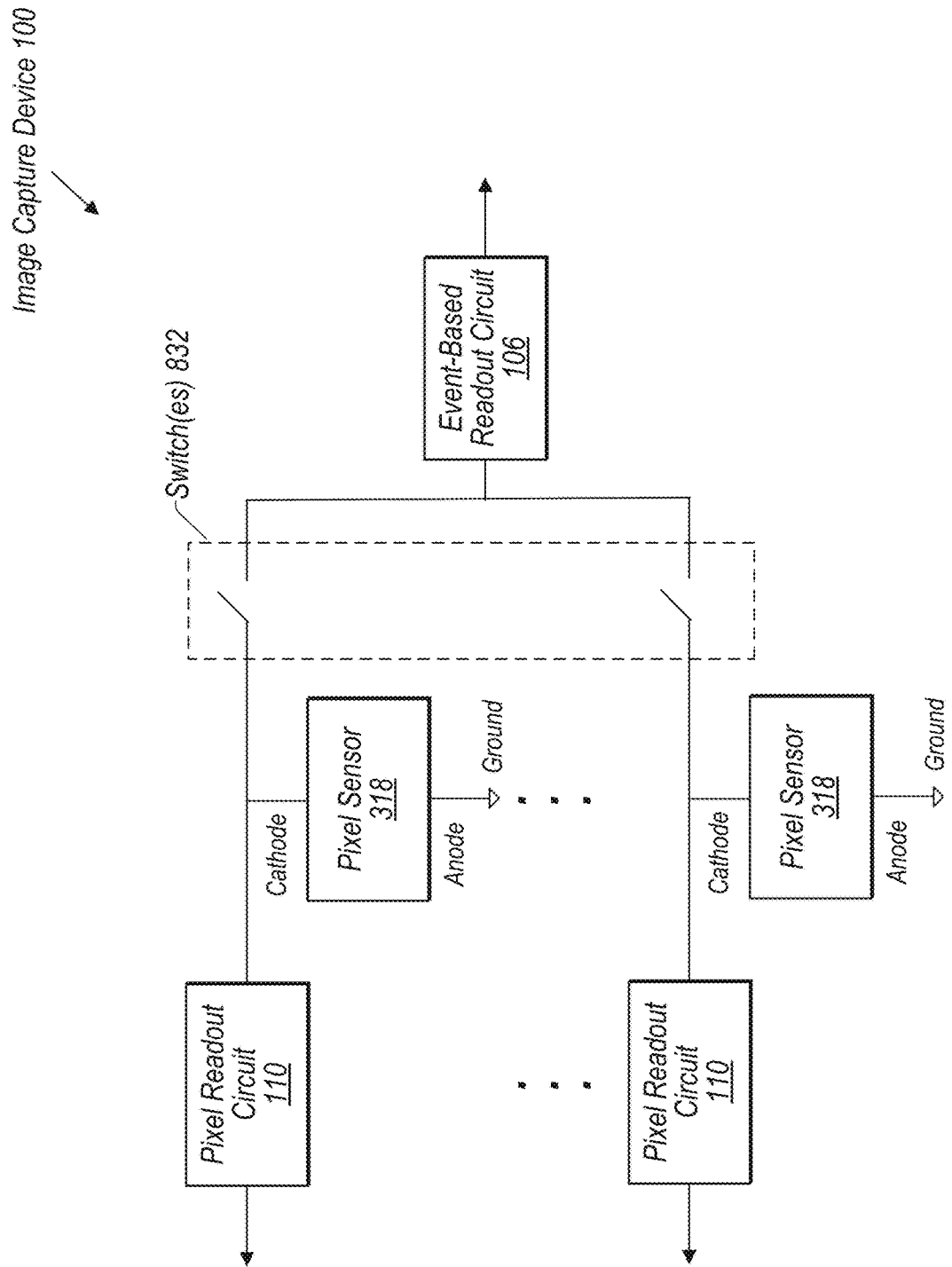
FIG. 8 shows example electrical connection of event-based readout circuits and image signal readout circuits with pixel sensors, according to some embodiments.

FIG. 8 is a block diagram showing example electrical connection of event-based readout circuits and image signal readout circuits with pixel sensors, according to some embodiments. As described above, in some embodiments, image capture device 100 may use pixel readout circuits 110 and event-based readout circuit 106 respectively to obtain signals from pixel sensors 318 of image sensor 102 to generate images and detect light flicker. In some embodiments, each pixel sensor 318 may include a cathode electrode and an anode electrode. As indicated in FIG. 8, in this example, image capture device 100 may use one pixel readout circuit 110 to read signals from one corresponding pixel sensor 318, and one event-based readout circuit 106 to read signals from a group of pixel sensors 318 at cluster level. In addition, in this example, pixel readout circuits 110 and event-based readout circuit 106 may be electrically coupled to the same electrodes of pixel sensors 318, e.g., all electrically coupled to the cathodes of pixel sensors 318. As described above, in some embodiments, the signals from pixel sensors 318 may be current. Thus, in FIG. 8, pixel readout circuits 110 and event-based readout circuit 106 may be considered to be connected in parallel with pixel sensors 318, and event-based readout circuit 106 may thus obtain a sum of the currents of coupled pixel sensors 318.

Because pixel readout circuits 110 and event-based readout circuit 106 are electrically coupled to the same electrodes of pixel sensors 318, in some embodiments, to reduce interference between the signal reading of pixel readout circuits 110 and event-based readout circuit 106, image capture device 100 may use one or more switches 832 to multiplex the electrical coupling between pixel readout circuits 110 and event-based readout circuit 106 with pixel sensors 318. This way, pixel sensors 318 may be electrically coupled with, and thus signals may be obtained by, pixel readout circuits 110 and event-based readout circuit 106 in an "interleaved" fashion. For example, when pixel readout circuits 110 are controlled to read signals from pixel sensors 318, switches 832 may be opened to decouple event-based readout circuit 106 from pixel sensors 318. Conversely, when pixel readout circuits 110 are not reading signals from pixel sensors 318, switches 732 may be closed to couple event-based readout circuit 106 with pixel sensors 318 to read signals from pixel sensors 318.

Figure 9:
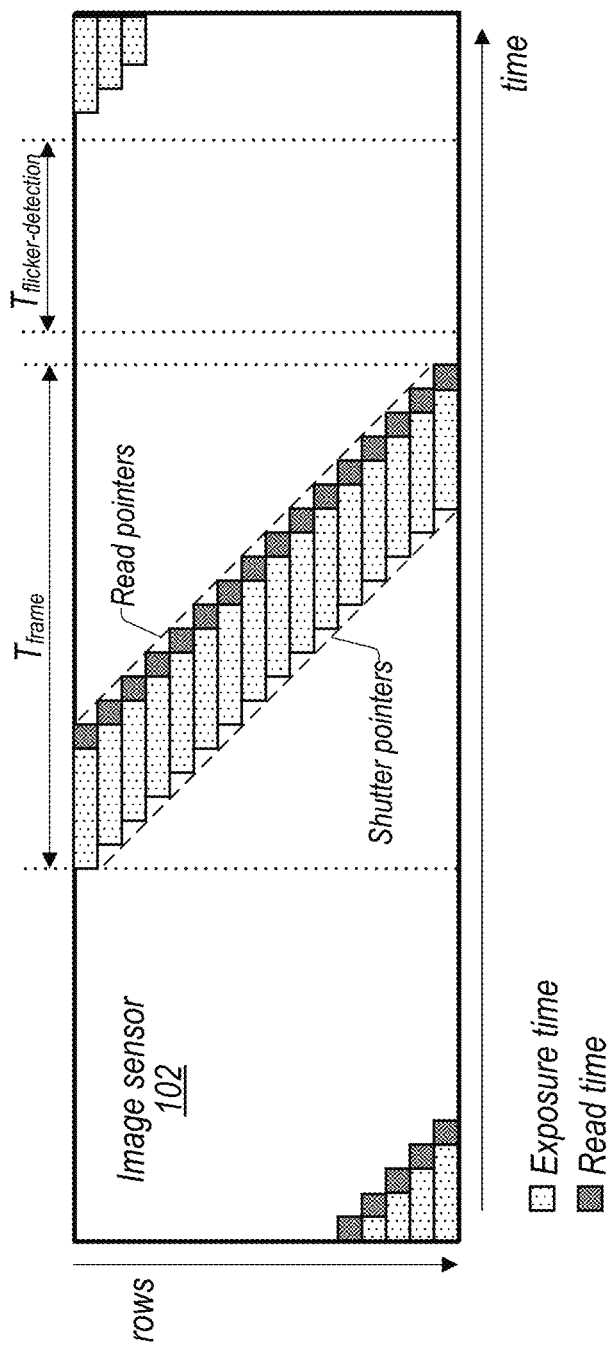
FIG. 9 shows example timing of reading signals from pixel sensors by image signal readout circuits and event-based readout circuits, according to some embodiments.

FIG. 9 shows example timing of reading signals from pixel sensors by image signal readout circuits and event-based readout circuits, according to some embodiments. As indicated in FIG. 9, when pixel readout circuits 110 and event-based readout circuit 106 are electrically coupled to the same electrodes of pixel sensors of image sensor 102, signal reading by event-based readout circuits 106 may not occur during the exposure time of image sensor 102. For example, the two dashed lines in FIG. 9 respectively indicate the approximate points-in-time to start exposing the individual pixel sensors (e.g., the shutter pointers) and reading signals from the pixel sensors by pixel readout circuits 110 for generating images (e.g., the read pointers), and $T_{flicker-detection}$ represents the time for performing the above described flicker detection, including reading of signals by event-based readout circuits 106 and analysis of events by event-based processing circuit 108. Thus, as indicated in FIG. 9, the reading of signals by event-based readout circuit 106 may not start until after the exposure of pixel sensors of image sensor 102 and subsequent reading of signals from the pixel sensors by pixel readout circuits 110.

Figure 10:
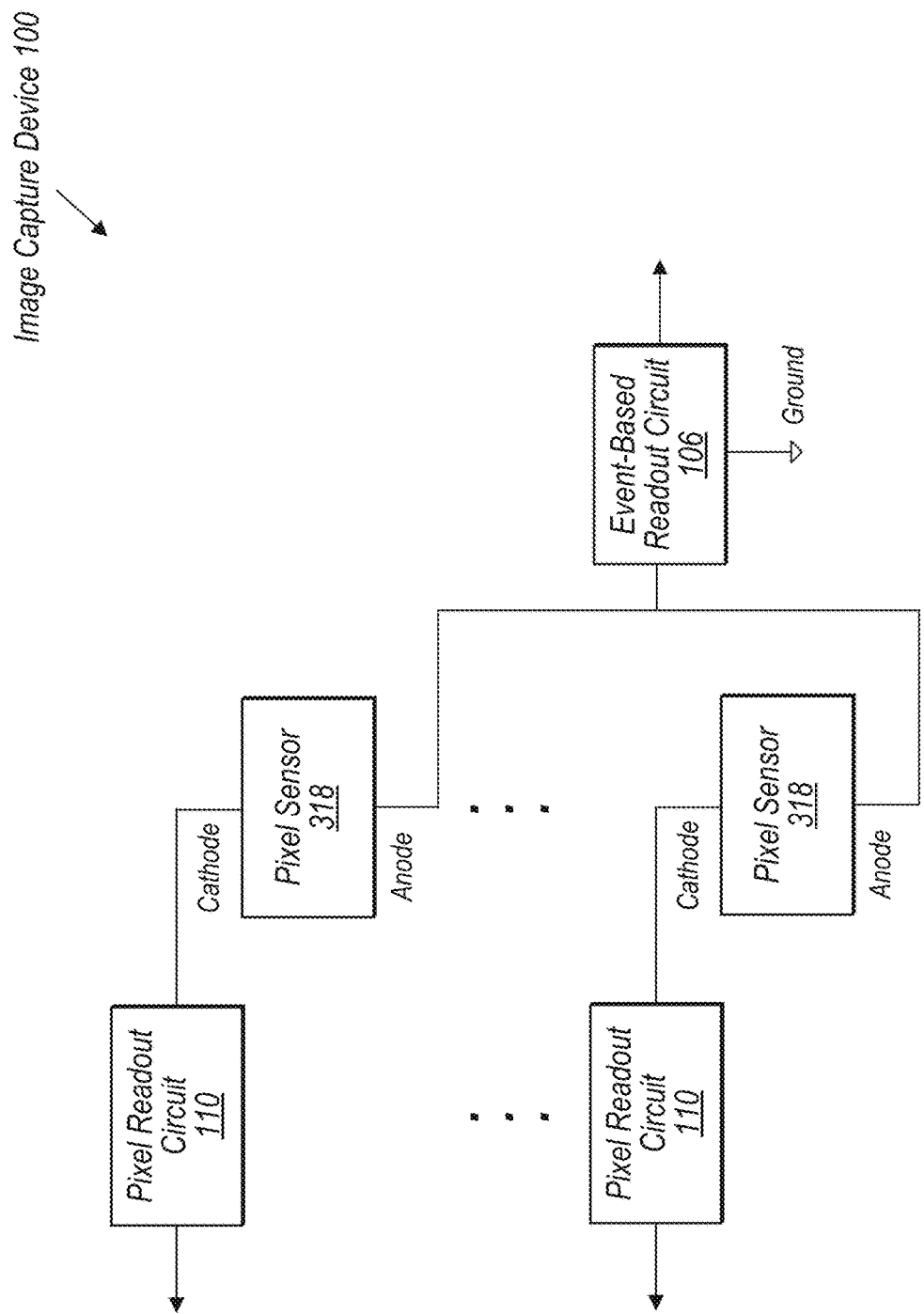
FIG. 10 shows another example electrical connection of event-based readout circuits and image signal readout circuits with pixel sensors, according to some embodiments.

FIG. 10 is a block diagram showing another example electrical connection of event-based readout circuits and image signal readout circuits with pixel sensors, according to some embodiments. In this example, pixel readout circuits 110 and event-based readout circuit 106 may be electrically coupled to different electrodes of pixel sensors 318. For example, pixel readout circuits 110 may be coupled to cathodes of pixel sensors 318, whereas event-based readout circuit 106 may be coupled to the anode of pixel sensors 318. Because pixel readout circuits 110 and event-based readout circuit 106 are electrically coupled to different electrodes, unlike FIG. 7, image capture device 100 may not necessarily require switches 832 to multiplex pixel sensors 318 between pixel readout circuits 110 and event-based readout circuit 106.

Figure 11:
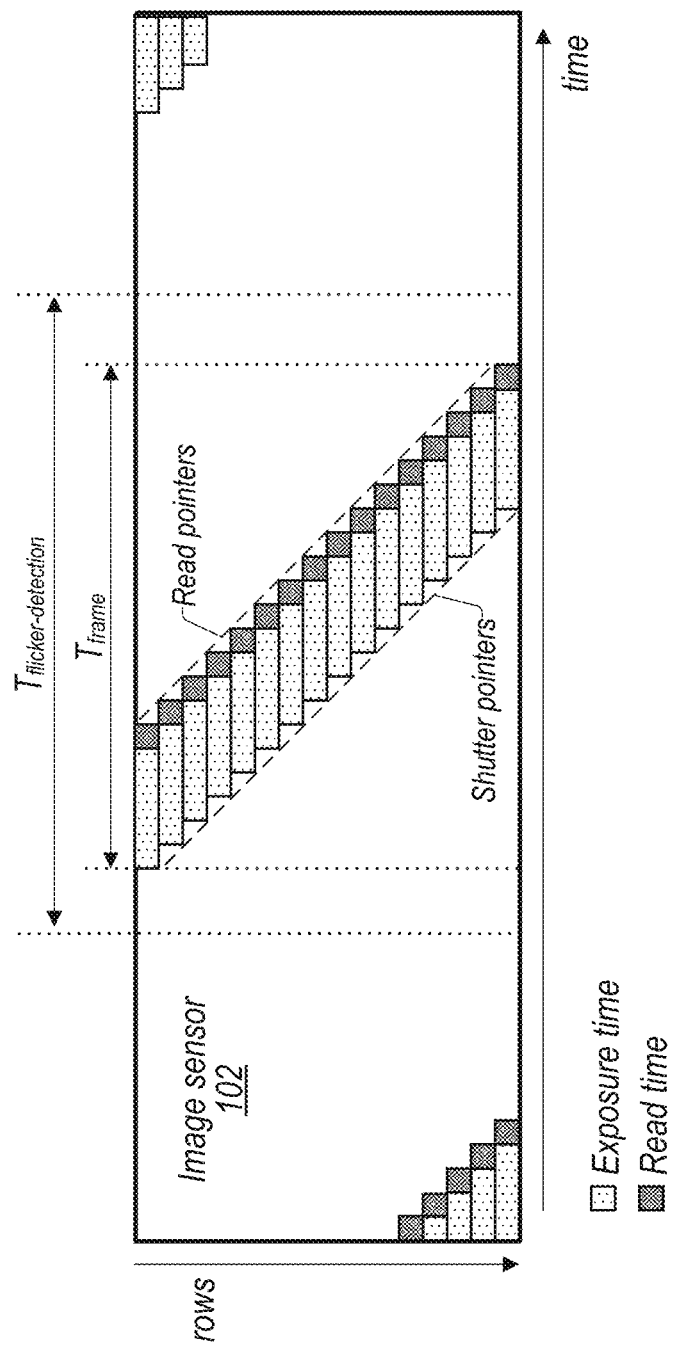
FIG. 11 shows another example timing of reading signals from pixel sensors by image signal readout circuits and event-based readout circuits, according to some embodiments.

FIG. 11 shows another example timing of reading signals from pixel sensors by image signal readout circuits and event-based readout circuits, according to some embodiments. As indicated in FIG. 11, when pixel readout circuits 110 and event-based readout circuit 106 are electrically coupled to different electrodes of pixel sensors of image sensor 102, signal reading by event-based readout circuits 106 may overlap with the exposure time of image sensor 102. For example, as indicated in FIG. 11, the performance of flicker detection, including reading of signals by event-based readout circuit 106, may take place at the same time with the exposure time of pixel sensors of image sensor 102 and/or reading of signals from the pixel sensors by pixel readout circuits 110.

Figure 12:
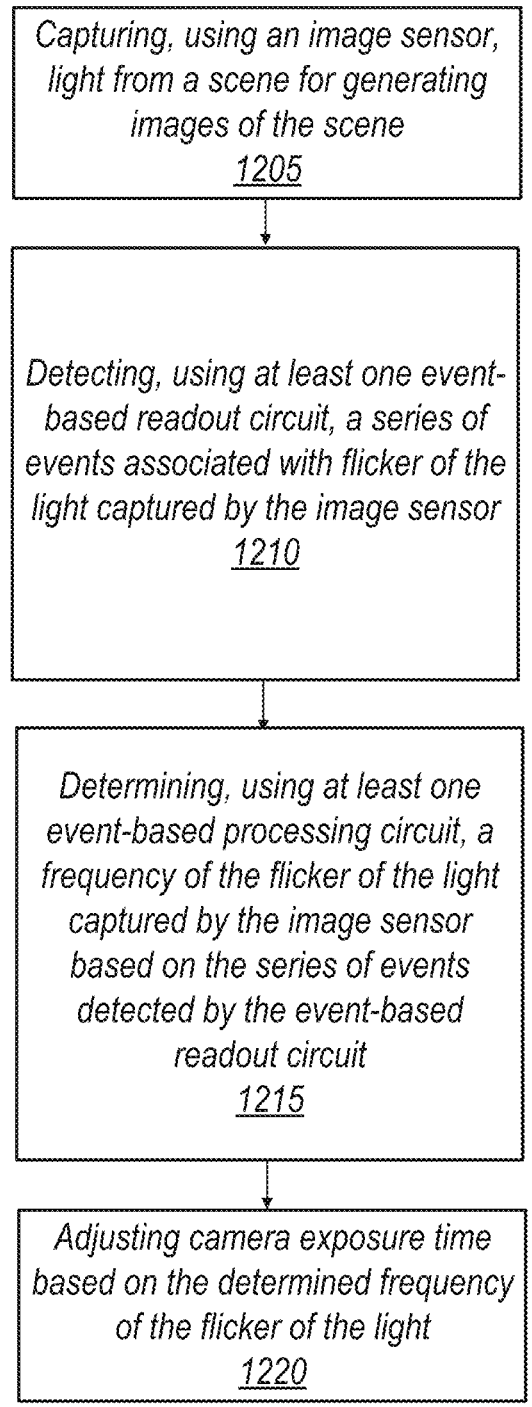
FIG. 12 shows a flowchart of an example method for detecting light flicker, according to some embodiments.

FIG. 12 shows a flowchart of an example method for detecting light flicker, according to some embodiments. In FIG. 12, in some embodiments, light from a scene may be captured using an image sensor (e.g., image sensor 102 of image capture device 100 as described above) for generating a plurality of images of the scene, as indicated in block 1205. In some embodiments, based on signals generated by the image sensor in response to the captured light, a series of events associated with flicker in the captured light may be detected using at least one event-based readout circuit (e.g., event-based readout circuit 106 of flicker detection circuit 104 of image capture device 100 as described above), as indicated in block 1210. As described above, in some embodiments, the events may include positive events, corresponding to logic high voltages in signal $e_p$, and negative events, corresponding to logic high voltages in signal $e_N$. In some embodiments, the positive and negative events respectively correspond to detected increase and decrease of the intensity of the captured light. In some embodiments, a frequency of the flicker in the captured light may be determined, using at least one event-based processing circuit (e.g., event-based processing circuit 108 of flicker detection circuit 104 of image capture device 100 as described above), based on the series of events detected by the event-based readout circuit, as indicated in block 1215. As described above, in some embodiments, the flickering frequency may be determined based on spectral analysis and/or bitstream correlation of the numbers of positive and/or negative events. In addition, in some embodiments, the camera exposure time may be adjusted based on the determined frequency of the flicker, as indicated in block 1220. For example, the intervals for exposing the image sensor may be adjusted based on bitstream cross-correlation of the numbers of positive and negative events. In some embodiments, the intervals may be identified to correspond to time durations when intensity of the captured light (though flicking) is high, or in other words, when the light is bright. In some embodiments, the exposure frequency of the image sensor may be adjusted be an integer multiple of the light flickering frequency to reduce effects of the light flickering.

Figure 13:
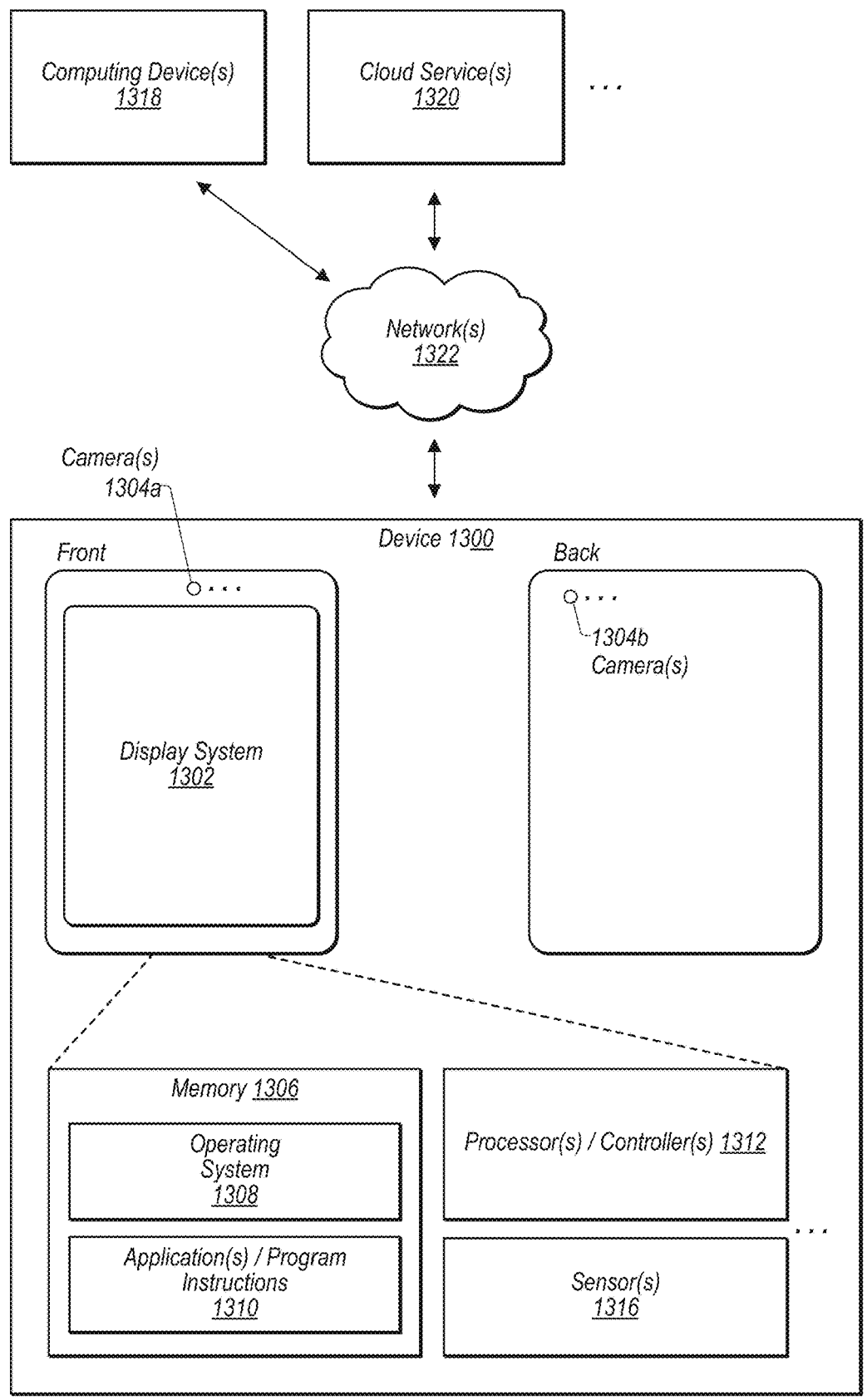
FIG. 13 illustrates a schematic representation of an example device that may include an image capture device having a flicker detection circuit, according to some embodiments.

FIG. 13 illustrates a schematic representation of an example device 1300 that may include an image capture device (e.g., image capture device 100) having a flicker detection circuit (e.g., flicker detection circuit 104), as described above, according to some embodiments. In some embodiments, the device 1300 may be a mobile device and/or a multifunction device. In various embodiments, the device 1300 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In some embodiments, the device 1300 may include a display system 1302 (e.g., comprising a display and/or a touch-sensitive surface) and/or one or more cameras 1304. In some non-limiting embodiments, the display system 1302 and/or one or more front-facing cameras 1304*a* may be provided at a front side of the device 1300, e.g., as indicated in FIG. 13. Additionally, or alternatively, one or more rear-facing cameras 1304*b* may be provided at a rear side of the device 1300. In some embodiments comprising multiple cameras 1304, some or all of the cameras may be the same as, or similar to, each other. Additionally, or alternatively, some or all of the cameras may be different from each other.

In various embodiments, the location(s) and/or arrangement(s) of the camera(s) 1304 may be different than those indicated in FIG. 13.

Among other things, the device 1300 may include memory 1306 (e.g., comprising an operating system 1308 and/or application(s)/program instructions 1310), one or more processors and/or controllers 1312 (e.g., comprising CPU(s), memory controller(s), display controller(s), and/or camera controller(s), etc.), and/or one or more sensors 1316 (e.g., orientation sensor(s), proximity sensor(s), and/or position sensor(s), etc.). In some embodiments, the device 1300 may communicate with one or more other devices and/or services, such as computing device(s) 1318, cloud service(s) 1320, etc., via one or more networks 1322. For example, the device 1300 may include a network interface (e.g., network interface 1310) that enables the device 1300 to transmit data to, and receive data from, the network(s) 1322. Additionally, or alternatively, the device 1300 may be capable of communicating with other devices via wireless communication using any of a variety of communications standards, protocols, and/or technologies.

Figure 14:
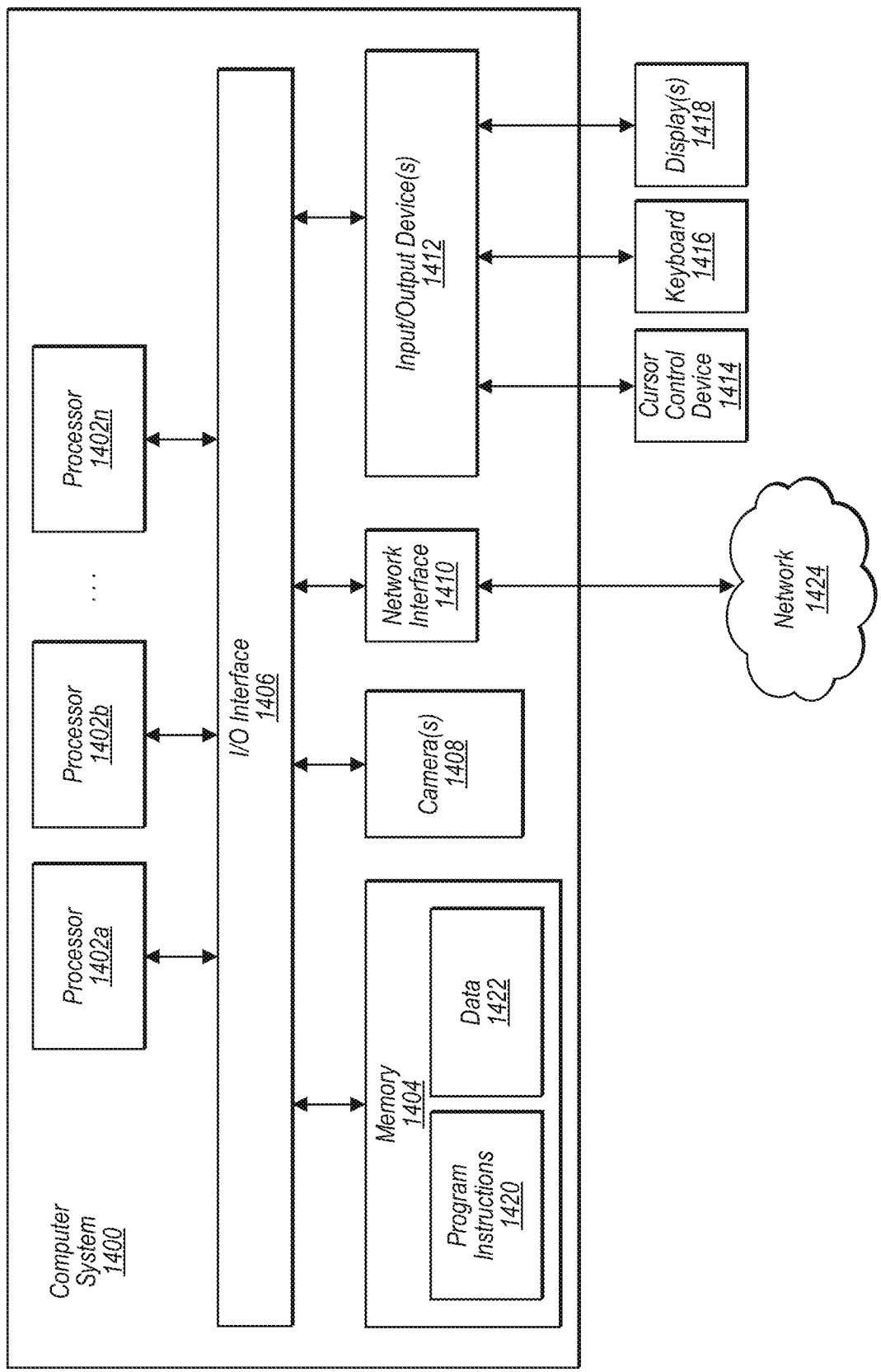
FIG. 14 illustrates a schematic block diagram of an example computing device that may include an image capture device having a flicker detection circuit, according to some embodiments.

FIG. 14 illustrates a schematic block diagram of an example computing device, referred to as computer system 1400, that may include or host embodiments of a computer device including an image capture device (e.g., image capture device 100) that may include a flicker detection circuit (e.g., flicker detection circuit 104), as described above, according to some embodiments. In addition, computer system 1400 may implement methods for controlling operations of the camera and/or for performing image processing images captured with the camera. In some embodiments, the device 1000 (described above with reference to FIG. 13) may additionally, or alternatively, include some or all of the functional components of the computer system 1400 described herein.

The computer system 1400 may be configured to execute any or all of the embodiments described above. In different embodiments, computer system 1400 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, an augmented reality (AR) and/or virtual reality (VR) headset, a consumer device, video game console, handheld video game device, application server, storage device, a television, a video recording device, a peripheral device such as a switch, modem, router, or in general any type of computing or electronic device.

In the illustrated embodiment, computer system 1400 includes one or more processors 1402 coupled to a system memory 1404 via an input/output (I/O) interface 1406. Computer system 1400 further includes one or more cameras 1408 coupled to the I/O interface 1406. Computer system 1400 further includes a network interface 1410 coupled to I/O interface 1406, and one or more input/output devices 1412, such as cursor control device 1414, keyboard 1416, and display(s) 1418. In some cases, it is contemplated that embodiments may be implemented using a single instance of computer system 1400, while in other embodiments multiple such systems, or multiple nodes making up computer system 1400, may be configured to host different portions or instances of embodiments. For example, in one embodiment some elements may be implemented via one or more nodes of computer system 1400 that are distinct from those nodes implementing other elements.

In various embodiments, computer system 1400 may be a uniprocessor system including one processor 1402, or a multiprocessor system including several processors 1402 (e.g., two, four, eight, or another suitable number). Processors 1402 may be any suitable processor capable of executing instructions. For example, in various embodiments processors 1402 may be general-purpose or embedded processors implementing any of a variety of instruction set architectures (ISAs), such as the x86, PowerPC, SPARC, or MIPS ISAs, or any other suitable ISA. In multiprocessor systems, each of processors 1402 may commonly, but not necessarily, implement the same ISA.

System memory 1404 may be configured to store program instructions 1420 accessible by processor 1402. In various embodiments, system memory 1404 may be implemented using any suitable memory technology, such as static random access memory (SRAM), synchronous dynamic RAM (SDRAM), nonvolatile/Flash-type memory, or any other type of memory. Additionally, existing camera control data 1422 of memory 1404 may include any of the information or data structures described above. In some embodiments, program instructions 1420 and/or data 1422 may be received, sent or stored upon different types of computer-accessible media or on similar media separate from system memory 1404 or computer system 1400. In various embodiments, some or all of the functionality described herein may be implemented via such a computer system 1400.

In one embodiment, I/O interface 1406 may be configured to coordinate I/O traffic between processor 1402, system memory 1404, and any peripheral devices in the device, including network interface 1410 or other peripheral interfaces, such as input/output devices 1412. In some embodiments, I/O interface 1406 may perform any necessary protocol, timing or other data transformations to convert data signals from one component (e.g., system memory 1404) into a format suitable for use by another component (e.g., processor 1402). In some embodiments, I/O interface 1406 may include support for devices attached through various types of peripheral buses, such as a variant of the Peripheral Component Interconnect (PCI) bus standard or the Universal Serial Bus (USB) standard, for example. In some embodiments, the function of I/O interface 1406 may be split into two or more separate components, such as a north bridge and a south bridge, for example. Also, in some embodiments some or all of the functionality of I/O interface 1406, such as an interface to system memory 1404, may be incorporated directly into processor 1402.

Network interface 1410 may be configured to allow data to be exchanged between computer system 1400 and other devices attached to a network 1424 (e.g., carrier or agent devices) or between nodes of computer system 1400. Network 1424 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 1410 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1412 may, in some embodiments, include one or more display terminals, keyboards, keypads, touchpads, scanning devices, voice or optical recognition devices, or any other devices suitable for entering or accessing data by one or more computer systems 1400. Multiple input/output devices 1412 may be present in computer system 1400 or may be distributed on various nodes of computer system 1400. In some embodiments, similar input/output devices may be separate from computer system 1400 and may interact with one or more nodes of computer system 1400 through a wired or wireless connection, such as over network interface 1410.

Those skilled in the art will appreciate that computer system 1400 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 1400 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1400 may be transmitted to computer system 1400 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A system, comprising:
   an image sensor configured to capture light for generating images; and
   a first circuit configured to detect flicker of the light received by the image sensor, comprising:
      at least one event-based readout circuit configured to detect a series of events associated with the flicker of the light captured by the image sensor; and
      at least one event-based processing circuit configured to determine a frequency of the flicker of the light captured by the image sensor based on the series of events detected by the event-based readout circuit;
   a second circuit configured to obtain signals from the image sensor for generating the images;
   wherein one of the first circuit and the second circuit is electrically coupled to a cathode of at least one pixel of the image sensor, and another one of the first circuit and the second circuit is electrically coupled to an anode of the at least one pixel of the image sensor.

2. The system of claim 1, wherein the event-based processing circuit is configured to perform spectral analysis of the series of events to determine the frequency of the flicker.

3. The system of claim 1, wherein the event-based processing circuit is configured to perform bitstream correlation of the series of events to determine the frequency of the flicker.

4. The system of claim 3, wherein the bitstream correlation is bitstream auto-correlation of the series of events to determine the frequency of the flicker.

5. The system of claim 1, wherein the event-based processing circuit is further configured to determine an interval for exposing the image sensor to the light.

6. The system of claim 5, wherein the bitstream correlation is bitstream cross-correlation of the series of events to determine the interval for exposing the image sensor to the light.

7. The system of claim 1, wherein the image sensor, the first circuit, and the second circuit are implemented on a same integrated circuit (IC).

8. The system of claim 1, wherein the image sensor comprises a plurality of pixel sensors, the first circuit comprises a plurality of event-based readout circuits, and individual ones of the event-based readout circuits correspond respectively to individual ones of the pixel sensors.

9. The system of claim 1, wherein the image sensor comprises a plurality of pixel sensors divided into a plurality of subsets each of which includes multiple ones of the plurality of pixel sensors, the first circuit comprises a plurality of event-based readout circuits, and individual ones of the event-based readout circuits correspond respectively to individual ones of the subsets of pixel sensors.

10. The system of claim 1, wherein the image sensor is a complementary metal-oxide-semiconductor (CMOS) image sensor or a charge-coupled device (CCD) image sensor.

11. A device, comprising:
an image sensor configured to generate signals based on light received by the image sensor;
a processor configured to process the signals from the image sensor to generate images;
a display configured to display the images generated by the processor; and
a first circuit configured to detect flicker of the light received by the image sensor, comprising:
at least one event-based readout circuit configured to detect a series of events associated with the flicker of the light received by the image sensor; and
at least one event-based processing circuit configured to determine a frequency of the flicker of the light received by the image sensor based on spectral analysis configured to determine a plurality of frequencies associated with the series of events, or bitstream correlation of the series of events detected by the event-based readout circuit.

12. The device of claim 11, wherein the event-based processing circuit is configured to perform the spectral analysis or the bitstream correlation of the series of events to determine the frequency of the flicker.

13. The device of claim 11, wherein the event-based processing circuit is further configured to determine an interval for exposing the image sensor to the light based on the series of events.

14. The device of claim 11, further comprising a second circuit configured to obtain the signals from the image sensor for the processor to generate the images.

15. The device of claim 14, wherein the first circuit and the second circuit are both electrically coupled to a cathode of at least one pixel sensor of the image sensor, and wherein the device further comprises at least one switch configured to multiplex the electrical coupling between the first circuit and the second circuit with the cathode of the at least one pixel.

16. The device of claim 14, wherein one of the first circuit and the second circuit is electrically coupled to a cathode of at least one pixel of the image sensor, and another one of the first circuit and the second circuit is electrically coupled to an anode of the at least one pixel of the image sensor.

17. A method, comprising:
capturing, using an image sensor, light from a scene for generating images of the scene;
detecting, using at least one event-based readout circuit, a series of events associated with flicker of the light captured by the image sensor; and
determining, using at least one event-based processing circuit, a frequency of the flicker of the light captured by the image sensor based on spectral analysis configured to determine a plurality of frequencies associated with the series of events, or bitstream correlation of the series of events detected by the event-based readout circuit.

\* \* \* \* \*